United States Patent [19]

van den Heuvel

[11] 4,246,032

[45] Jan. 20, 1981

[54] PROCESS FOR CONTROLLING THE POSITION OF FIBROUS WEBS

[75] Inventor: Eeuwoud van den Heuvel, Helmond, Netherlands

[73] Assignee: Vlisco B.V., Helmond, Netherlands

[21] Appl. No.: 85,400

[22] Filed: Oct. 16, 1979

Related U.S. Application Data

[63] Continuation of Ser. No. 780,091, Mar. 22, 1977, abandoned, and a continuation-in-part of Ser. No. 563,450, Mar. 31, 1975, abandoned.

[30] Foreign Application Priority Data

May 3, 1974 [NL] Netherlands .......................... 7405989

[51] Int. Cl.³ ...................... C09D 5/23; C09D 11/08; C09D 11/10; C09D 11/14
[52] U.S. Cl. ..................................... 106/19; 101/327; 101/328; 101/331; 106/26; 106/32; 106/187; 106/188; 106/189; 106/193 M; 106/308 C; 106/308 N; 252/62.53; 252/62.54
[58] Field of Search ..................... 106/19, 26, 32, 187, 106/188, 189, 193 M, 308 C, 308 N; 252/62.53, 62.54; 101/327, 328, 331

[56] References Cited

U.S. PATENT DOCUMENTS

| | | | |
|---|---|---|---|
| 3,237,973 | 3/1966 | Rumberger | 101/426 X |
| 3,515,590 | 6/1970 | Lazzarini et al. | 106/26 X |
| 3,525,694 | 8/1970 | Bisschops et al. | 252/62.51 X |
| 3,810,840 | 5/1974 | van Ruler et al. | 252/62.54 |
| 4,020,759 | 5/1977 | van den Heuvel et al. | 101/328 |
| 4,032,350 | 6/1977 | Greenstein | 106/193 M X |

FOREIGN PATENT DOCUMENTS

1332353 6/1963 France .
7106701 11/1972 Netherlands .

*Primary Examiner*—Howard E. Schain
*Attorney, Agent, or Firm*—Cushman, Darby & Cushman

[57] ABSTRACT

A process for controlling the position of fibrous webs to be printed by applying thereon a ferromagnetic printing paste in the form of very small dots which are not visible or palpable, which paste consists of at least 85% by weight, based on the total solid content, of a finely divided ferromagnetic material and furthermore of a cellulose ester and a solvent having a boiling point above 130° C.

8 Claims, No Drawings

PROCESS FOR CONTROLLING THE POSITION OF FIBROUS WEBS

This is a continuation of application Ser. No. 780,091 filed Mar. 22, 1977, now abandoned, and a continuation-in-part of application Ser. No. 563,450 filed Mar. 31, 1975, now abandoned.

The invention relates to a process for controlling the position of fibrous webs to be printed by applying a ferromagnetic printing paste comprising in addition to a finely divided ferromagnetic material also a cellulose ester as binder and a solvent.

Such a process is known from U.S. Pat. No. 3,237,973. According to the process described therein the ferromagnetic printing paste is applied in the form of dots at the edge of the web, stripes over the width of the web or a continuous stripe along the edge of the web by means of a cylindrical printing roller. Then the fibrous web is passed into a conventional oven to dry the solution of the magnetic particles. Subsequently the dots, the stripes over the width of the fibrous web, or parts of the continuous stripe along the edge of the web are magnetized by means of a conventional magnetizing device. As a useful ferromagnetic material is mentioned inter alia finely divided iron. The ferromagnetic printing paste furthermore comprises a binder to bond the magnetic particles to the fibrous web. There are mentioned cellulose esters, nitrocellulose and other possible binders. Finally, the printing pastes according to said U.S. patent may comprise also plasticizers, pigments and solvents, insofar as they do not affect the properties of the magnetic particles.

It is the object of the invention to provide a process according to which in a simple and cheap manner fibrous webs can effectively be provided with ferromagnetic markings without the final fibrous webs, after having been printed one or more times or having undergone other treatments, being disfigured by the visible or palpable presence of the ferromagnetic markings.

This object according to the invention is realized by applying in very small dots, which are neither visible nor palpable, a printing paste having a content of ferromagnetic material of at least 85% by weight, based on the total solid content, and as solvent a solvent or a mixture of solvents having a boiling point of at least 130° C. in a sufficient amount to obtain a viscosity of at least 50,000 cP, the upper limit for the viscosity being determined by the requirement that the paste does not flow from its dispenser by gravity and that it can be pressed through a narrow opening under a slight overpressure in accurate small doses without drawing strings.

The present process shows many advantages over the process according to U.S. Pat. No. 3,237,973. Thanks to the process according to the invention there are obtained products which are not disfigured by the markings applied for the positioning during the various treatments of the fibrous webs. Since the very small dots applied according to the invention are not visible or palpable in the ready fibrous webs, they can also be applied in the middle of the fibrous webs to be printed or treated. As a result, also less stiff materials, such as textile, can be positioned exactly. In comparison with the present process, according to the process of U.S. Pat. No. 3,237,973 there are applied much greater amounts of the marking composition which in itself is already less economical. Moreover, the use of greater amounts of marking composition makes it necessary to employ an oven to dry the markings. In the process according to the invention the dots applied are so small that the use of an oven is not necessary.

From the above it appears that the novel process according to the invention means a great technical advance, since by means of a more economical process there are obtained superior products. Moreover, the solution of the problems that remain in the process according to U.S. Pat. No. 3,237,973 as given in the process according to the invention cannot be considered to be obvious to a person skilled in the art. For there are possible many ways of solving the above problem. For example, it might be considered to apply a marking paste which can be removed chemically after the fibrous webs have undergone the various treatments. Therefore, an extensive search has been made in this direction, but a paste, which on the one hand was resistant to the various possible treatments of the fibrous webs and on the other hand could be removed by a simple chemical treatment, has not been found. An other possible solution of the problems was the mechanical removal of the applied markings when they were applied at the edges of the fibrous webs to be printed or to be treated. These edges could be cut off as a final step. Of course, such markings can only be applied at the edges of fibrous webs, which is a drawback for the positioning of less stiff fibrous webs, such as textile. Moreover, for the chemical or mechanical removal of the markings there is required an additional step, which is lacking in the solution found according to the invention.

In order to be able to realize the idea of the invention, the ferromagnetic printing paste has to comply with several requirements. These requirements are:

1. The ferromagnetic material in the paste, in general substantially consisting of iron powder, must not sediment during use.
2. The printing paste must have such viscosity characteristics that in the lower position of the dispenser delivering the printing paste no flow takes place by gravity and that it can be pressed through a narrow opening under a slight overpressure in accurate small doses without drawing strings.
3. It must be possible for the paste to be incorporated in the fibrous web as soon as possible, preferably within a fraction of a second.
4. Once applied on the web and dried in, the marking dot, in particular in textile webs, must be resistant without extra aftertreatments to treatments with acidic or alkaline aqueous solutions, soap solutions, organic solvents and the like, both at ambient and higher temperatures. The marking dots must also be resistant to the combination of these agents with mechanical, abrasive treatments.
5. The paste must have a very high content of ferromagnetic material, so that with a relatively small dot it is possible to have a great magnetic response.
6. The marking dot must not affect the appearance and feel of the web. Therefore, the dot must be very small, preferably smaller than 1 mm.

These requirements are very specifically attached to the problem which the invention intends to solve. Therefore, for other purposes there are known many ferromagnetic materials which do not comply with these requirements, and, consequently, are not suitable for the process according to the invention. For example, reference can be made to U.S. Pat. No. 3,515,590, wherein is described a coating composition comprising a pigment, a plasticizer and a solvent system dispersed in a resin. Such a composition, wherein the pigment may be finely divided magnetizable particles, can be suitably applied on typewriter ribbons. As solvents are mentioned methyl ethyl ketone and N-propyl acetate, which both have a boiling point far below 130° C. Already for this reason the ferromagnetic materials according to U.S. Pat. No. 3,515,590 cannot be used in the process according to the invention.

As was said before, the ferromagnetic printing paste, which according to the invention can be suitably used for controlling the position of fibrous webs to be printed in the form of very small dots, contains at least 85% by weight of ferromagnetic material, based on the total solid content. As ferromagnetic material is preferably used iron. Furthermore the printing paste according to the invention contains a cellulose ester as binder, preferably nitrocellulose. The nitrocellulose is preferably used in stabilized condition, e.g. as a 65% product stabilized with 35% ethanol. The printing paste according to the invention also comprises a sufficient amount of solvent having a boiling point above 130° C. to obtain such a viscosity that no sedimentation occurs.

Already in a small concentration relative to the solvents, the cellulose ester binder provides a sufficient viscous liquid to minimize sedimentation of the ferromagnetic powder. This condition (see also point 1) is satisfied when the viscosity has a value of about 50,000 cP and higher, the upper limit of course being fixed by the condition of point 2. By the preferably used nitrocellulose binder is meant a cellulose which is treated in a known per se manner with a mixture of nitric acid and sulphuric acid and which may contain 1-3 nitrate groups per glucose unit.

The choice of the solvent is determined by the requirements that the cellulose ester, such as preferably nitrocellulose, can dissolve and that it may not evaporate too quickly or have too low a boiling point, since otherwise the paste will dry up, which causes clogging of the outflow opening of the dispenser. Moreover, it must be capable of giving the above-mentioned viscosity values to the paste. Suitable solvents that satisfy the above requirements are amylacetate, diacetone alcohol, diethylene glycol monomethylether and mixtures thereof or with toluene. Very suitable is a mixture of amylacetate and diethylene glycol monomethylether, which is commercially available under the name methyldioxitol.

The relative amounts of binder, solvents and the ferromagnetic material are so selected that the above-mentioned conditions are satisfied.

In order to prepare a mixture containing 1000 grams of iron powder, at least 50 grams of (whether or not stabilized) nitrocellulose are needed and a varying amount of solvent, for example 400-800 cm$^3$. A suitable amount of solvent can be determined by a person skilled in the art in a simple manner. A preferred composition comprises 5-10% by weight of nitrocellulose, based on the total amount of solids. The composition can be prepared by dissolving the nitrocellulose in the solvent and subsequently adding the iron powder. As ferromagnetic material is preferably used very finely divided iron powder having a preferred particle size of between $0.2 \times 10^{-3}$ and $0.8 \times 10^{-3}$ mm. These data are also applicable to other cellulose esters than nitrocellulose.

EXAMPLE 1

A printing paste was prepared by dissolving 100 grams stabilized nitrocellulose in 200 cm$^3$ amylacetate and 240 cm$^3$ methyldioxitol and subsequently adding 1000 grams iron powder having an average particle size of 0.5 microns under agitation. The resultant printing paste, which had a viscosity of 50.000 cP, was put into a plurality of detachable dispensers which were subsequently mounted at the circumference of a rotatable roller, which dispensers were connected to channel openings for supplying the printing paste in accurate small doses. The printing paste was kept under a slight overpressure to control the outflow of the paste through the channel opening. It appeared that an overpressure of 0.2 atmosphere caused a sufficient outflow to form a dot of the desired size (0.06 mm$^3$ per dot). The rotatable roller contained three dispensers and had a speed of rotation of 120 revolutions per minute so that there was available only half a second for the outflow of the printing paste from the dispenser and only a fraction of half a second for applying the printing paste onto the textile web to be treated. The dot appeared to be resistant to conventional textile finishing treatments. Moreover, it appeared that, if the dispensers were not used immediately after having been filled but stored for 24 hours while being slowly rotated, no sedimentation of the iron powder occurred and that the filled dispensers were still ready for direct use.

EXAMPLE 2

In Table A are given a number of pastes according to the invention containing the components in different ratios.

TABLE A

| | | 1 | 2 | 3 | 4 | 5 | 6 | 7 | 8 | 9 | 10 | 11 |
|---|---|---|---|---|---|---|---|---|---|---|---|---|
| Nitrocellulose 15E/HP 180 (with 35% ethanol) | grams | 100 | 100 | 100 | 150 | 150 | 200 | 200 | 200 | 200 | 200 | 300 |
| Amylacetate | ml | 430 | 200 | | | | | | | | 880 | 880 |
| Toluene | ml | 80 | | | | | | | | | | |
| Diacetone alcohol | ml | | | 200 | 420 | 420 | 640 | 640 | 640 | 880 | | |
| Methyldioxitol | ml | | 240 | 240 | 240 | 240 | 240 | 240 | 240 | | | |
| Fe (0.2–0.8 microns) | grams | 1000 | 1000 | 1000 | 1000 | 1300 | 1000 | 1300 | 1500 | 1500 | 1500 | 1500 |
| % Fe based on total solids | | 93.89 | 93.89 | 93.89 | 91.11 | 93.02 | 88.49 | 90.90 | 92.02 | 92.02 | 92.02 | 88.49 |

I claim:

1. A process for controlling the position of fibrous webs to be printed by applying a ferromagnetic printing paste through a narrow opening in a dispenser, said paste comprising in addition to a finely divided ferromagnetic material a cellulose ester as binder and a solvent, characterized by applying in very small dots, which are neither visible nor palpable, a printing paste having a content of ferromagnetic material of at least 85% by weight, based on the total solid content, and as a solvent a solvent or a mixture of solvents having a boiling point of at least 130° C. in a sufficient amount to obtain a viscosity such that the paste does not flow from its dispenser by gravity and that it can be pressed through the narrow opening under a slight overpressure in accurate small doses without drawing strings.

2. A process according to claim 1, characterized by using a printing paste containing a content of ferromagnetic material of 90–95% by weight, based on the total solid content.

3. A process according to claim 1, characterized by using a printing paste containing as cellulose ester ethanol-stabilized nitrocellulose.

4. A process according to claim 1, characterized by using a printing paste containing a ferromagnetic material having a particle size of 0.2–0.8μ.

5. A process according to claim 1, characterized by using as solvent amylacetate, diethylene glycol monomethylether, diacetone alcohol or mixtures thereof or with toluene.

6. A process for controlling the position of fibrous webs to be printed by applying a ferromagnetic printing paste of the kind which comprises finely divided iron, nitrocellulose as binder and a solvent, said process being characterized by applying the paste through a narrow opening in a dispenser in the form of very small dots, which are neither visible nor palpable, the printing paste having a content of finely divided iron of 90–95% by weight, based on the total solid content, which finely divided iron has a particle size of 0.2–0.8μ, and as solvent amylacetate, diethylene glycol monomethylether, diacetone alcohol or mixtures thereof or with toluene in a sufficient amount to obtain a viscosity such that the paste does not flow from its dispenser by gravity and that it can be pressed through the narrow opening under a slight overpressure in accurate small doses without drawing strings.

7. A process as in claim 1 wherein the applied dots have a size of less than a millimeter.

8. A process as in claim 6 wherein the applied dots have a size of less, than a millimeter.

* * * * *